May 31, 1949.  A. F. PANTUOSCO  2,471,651
AUTOMATIC IGNITION SHUTOFF DEVICE
Filed Nov. 8, 1946
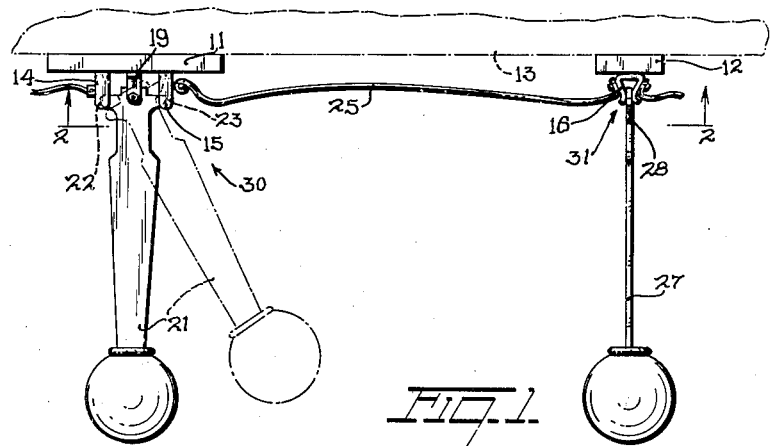
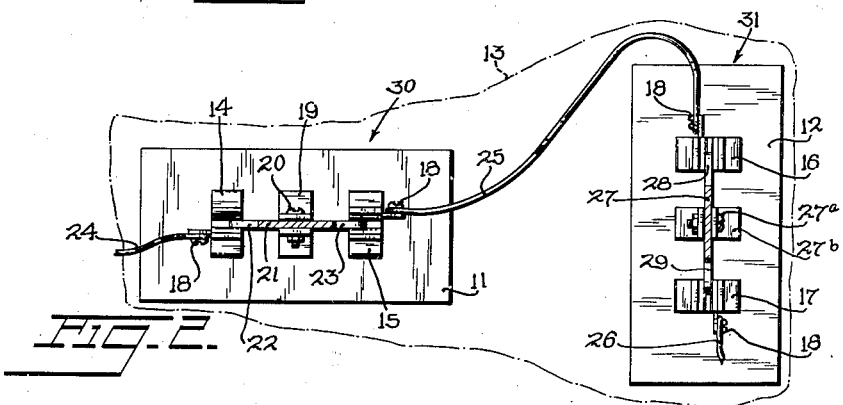
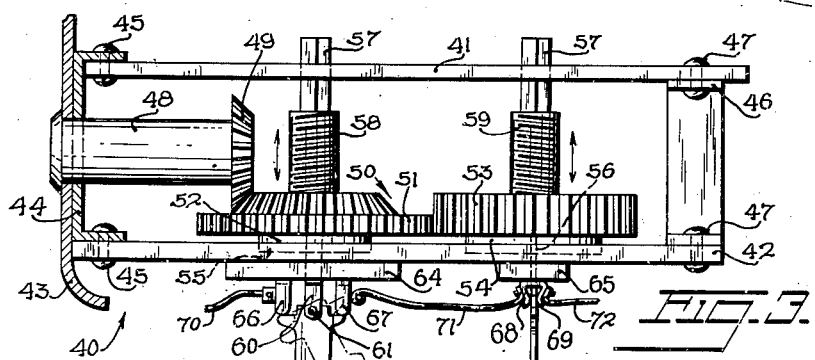
INVENTOR.
ANTHONY PANTUOSCO
BY
ATTORNEY Patented May 31, 1949

2,471,651

UNITED STATES PATENT OFFICE 2,471,651

AUTOMATIC IGNITION SHUTOFF DEVICE

Anthony F. Pantuosco, New York, N. Y.

Application November 8, 1946, Serial No. 708,555

4 Claims. (Cl. 200—52)

The present invention concerns an automatic ignition shut-off for automobiles and refers more particularly to a device adapted to break the ignition electrical circuit of an automobile upon the application of force to the automobile from any direction.

An object of the present invention is to provide a safety device which will shut off the ignition current in case of accident to the automobile either by hitting an object in the course of the automobile's progress or being hit by a moving object coming either head on or from the side or slantwise.

Another object is to simplify the mechanism by which such means are presently accomplished by devices known in the art.

A further object is to provide means for adjusting the sensitiveness of the mechanism, so that the device may be used for two distinct purposes, the first being the ignition shut-off in case of accident and the second being theft prevention. In using the device for the second purpose, the mechanism is set to the more sensitive adjustment when the car is left locked, and any attempt to drive the car away without resetting the mechanism to the less sensitive adjustment, will result in disconnection of the ignition circuit without disclosing to the thief what has happened.

In accomplishing the objects of the present invention, a pair of electrical contacts are placed in the ignition circuit of the automobile in spaced relation, the line between them being substantially parallel to the length of the car. A pendulum is suspended between them so that in its position of rest, two of its portions which are electrically conductive and interconnected contact the aforementioned contacts so that said contacts are electrically connected.

The contacts used are preferably female knife-switch elements and the pendulum comprises knife-blade elements contacting each of the female switch elements and the pivotal mounting of the pendulum is such that considerable swinging of the pendulum is possible without disconnecting the two electrical contact members in the ignition circuit.

Upon the automobile, however, receiving a shock of predetermined severity, the pendulum will swing in a wider arc and one of the knife-blade elements will be disconnected from its corresponding knife-switch contact and the ignition will thereupon be shut off by having the electrical circuit broken. A similar device is placed with the line between the electrical contact members extending transversely of the automobile in order to respond to shocks in a transverse direction. Thus, whether the automobile is hit from the front or rear or side or collides with an object in the course of a forward path or a sidewise skid, the ignition circuit will be broken so that fire will not break out accidentally in the wreckage.

In a modified form of the invention, the aforementioned and described apparatus may be rendered more sensitive in order to guard against theft of the automobile. In such modified form of the invention, the pivotal mounting of the pendulum is slidable vertically and controllable from the dashboard. A lock, preferably distinct from the ignition lock, bears on the rear end of its cylinder a bevel gear meshing with a bevel gear supported in a substantially horizontal plane. The second bevel gear is internally screw threaded and engages a screw which is supported so as to be non-rotatable and slidable vertically. Rotation of the cylinder lock, therefore, rotates the two bevel gears and the screw, being unable to rotate with the gear surrounding it, is moved vertically.

The screw is connected to the supporting member of the pendulum pivot and the pivot is moved to its lowermost position, in which it just barely contacts the two contact members. The slightest movement of the automobile body will thereupon cause the pendulum to become disconnected from one or the other of the contact members, breaking the ignition circuit. Below the driven bevel gear is a spur gear engaging a similar spur gear, the latter engaging a screw, similar in all respects to the first mentioned screw except that it is oppositely threaded. This second screw controls the pivotal mounting of the second pendulum. Rotation of the cylinder lock, therefore, causes both of these pendulums to assume their most sensitive position, in which case they act to prevent theft of the car, as the car cannot be driven without disturbing both of the pendulums, and disturbing either one breaks the ignition circuit. When the pendulums are restored to their less sensitive position by opposite movement of the cylinder lock, they act as a safety device in case of collision as above described.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevation of the device embodying the present invention.

Fig. 2 is a section on the line 2—2 of Fig. 1.

Fig. 3 is a side elevation of the modified form of the invention showing means for increasing and decreasing the sensitivity of the device.

Referring now in detail to the drawings, the insulating blocks 11 and 12 are mounted on any suitable substantially horizontal surface 13, preferably a board or sheet of metal extending forwardly from the backside of the dashboard of the automobile.

Block 11 extends longitudinally of the automobile and block 12 extends transversely thereof. Mounted in spaced relation on blocks 11 and 12 are the female knife-switch contact members 14, 15, 16 and 17, each of such contact members being provided with a connection 18 for an electrical lead wire.

Standard 19 is located between contact members 14 and 15 and provides a mounting for pivot 20 of pendulum 21. Pendulum 21 has the electrically conductive ears 22 and 23 located on opposite sides thereof and extending into the female knife-switch components 14 and 15. As illustrated, pendulum 21 is a single piece of electrically conductive material; however, it is only necessary for proper operation of the device that the ears 22 and 23 be electrically conductive and connected to each other. Pendulum 21 may swing considerably in its arc without disconnecting the contact members 14 and 15. However, when it reaches the broken line position of Fig. 1, ear 22 comes out of contact member 14, thereby disconnecting it from contact member 15 and similarly a swing in the opposite direction of equal amplitude would cause ear 23 to become disconnected from contact member 15, likewise breaking the electrical connection.

Lead wire 24 is connected to contact member 14 by a connection element 18 and the other end of wire 24 leads to the distributor of the automobile. Lead wire 25 extends between contact members 15 and 16, being connected thereto by the screw connection 18. Lead wire 26 leads from contact member 17 to the battery of the automobile. Pendulum 27 is mounted on pivot 27a in standard 27b located between contact members 16 and 17 and the general arrangement of pendulum 27 relative to contact members 16 and 17 is similar to the corresponding arrangement of pendulum 21 to its contact members, pendulum 27 having the ears 28 and 29 extending into the female knife-switch elements or contact members 16 and 17.

There are thus provided automatic shut-off devices 30 and 31 each arranged in the electric ignition circuit of the automobile and each adapted to break said circuit upon the application of a given force to the automobile in a predetermined direction. Each device is arranged relative to the other so that any force acting upon the automobile, of a predetermined magnitude, will cause one or both of the devices 30 and 31 to operate, thus breaking the ignition circuit and preventing combustion of oil and gasoline leaking from broken ducts. This latter is common in an automobile accident, when said gasoline or oil contacts exposed live electric wires.

In Fig. 3 is shown a modification of the above invention applied so as to act both as a safety device in case of collision or upset and also as an anti-theft device upon operation of adjusting means which may preferably, as illustrated, be locked.

The device 40 comprises the upper plate 41 and lower plate 42 extending forwardly from the rear side of an automobile dashboard 43 suitably connected thereto as by angle iron 44 and rivets 45. The plates are further connected to each other at their forward end by angle iron 46 and rivets 47 to form a generally rectangular open frame. A cylinder lock 48 is mounted on dashboard 43 in conventional manner and carries at its rear end a bevel gear 49, the latter extending in a vertical plane and meshing with bevel gear 50 extending in a horizontal plane. Gear 50 is fast to spur gear 51, which is mounted on anti-friction bearing 52 on plate 42. Gear 51 meshes with spur gear 53 which is mounted on anti-friction bearings 54 in plate 42. Shafts 55 and 56 have non-circular, preferably square, portions 57 slidably mounted in plate 41. Shaft 55 further has the threaded portion 58 which engages complementary internal threads formed on gears 50 and 51. Shaft 56 has the oppositely threaded portion 59 which engages complementary internal threads formed in gear 53. Shaft 55 terminates at its lower end in standard 60 bearing pivot 61 of pendulum 62. Shaft 56 terminates at its lower end in a standard similar to standard 60 and bearing the pivot of pendulum 63. Insulating block 64 is mounted on the underside of plate 42 concentrically around shaft 55 and bears the electrical contact members 66 and 67. Insulating block 65 is mounted on the underside of plate 42 concentrically about shaft 56 and bears the contact members 68 and 69 in spaced relation on opposite sides of shaft 56. Lead wire 70 leads from contact members 66 to the automobile distributor, lead wire 71 leads from contact member 67 to contact member 68 and lead wire 72 leads from contact member 69 to the battery of the automobile.

The method of operation of this form of the invention is as follows:

Upon the insertion of a key in cylinder lock 48 and revolution of the cylinder thereof, gear 49 is revolved thereby driving gears 50, 51 and 53. Supposing left to right movement of the visible portions of gears 50, 51, shaft 55 will be caused to travel downward to the illustrated position of Fig. 3. Such movement of gear 51 causes opposite movement of gear 53 which, through threaded portion 58, 59, causes downward motion of shaft 56 to the lower position of Fig. 3, as illustrated. As best seen in the illustration of pendulum 62, the ears thereof are just barely in contact with contact members 66, 67, so that a slight movement of the automobile will cause one of the ears or the other to come out of contact with its corresponding contact member. A similar relation of parts exists in pendulum 63 relative to its contact members 68, 69. In this position of the device embodying the invention, the automobile cannot be driven as the slight movement of the body consequent on driving will cause continual interruption of the ignition circuit. Since lock 48 is a separate lock from the ignition lock, the thief will not know what is wrong with the automobile as the ignition lock will be in operation to the best of his knowledge. In order to drive the automobile normally, the cylinder lock must be revolved oppositely to the revolution which caused lowering of the pendulums 62, 63. Such opposite revolution of cylinder lock 48 will cause opposite action of the gears described above and will raise the pendulums 62, 63 to their uppermost position and the operation thereof will thereafter be the less sensitive operation of the device described in Figs. 1 and 2.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an automatic ignition shut-off device for automobiles, in combination, upper and lower substantially horizontal plates, means for supporting said plates in substantially parallel relation, a shaft slidably supported in said plates for vertical motion and fixed against rotation, two electrical contacts located in the ignition circuit of the automobile in spaced relation and a pendulum connected to said shaft and having electrically conductive portions electrically connected together and adapted to contact said electrical contacts to connect the same electrically in certain positions of said pendulum throughout a relatively wide arc of said pendulum, and means for moving said shaft vertically so as to connect said contact members only throughout a relatively narrow arc of said pendulum.

2. In an automatic ignition shut-off device for automobiles, in combination, upper and lower substantially horizontal plates, means for supporting said plates in substantially parallel relation, a shaft slidably supported in said plates for vertical motion and fixed against rotation, two electrical contacts located in the ignition circuit of the automobile in spaced relation and a pendulum connected to said shaft and having electrically conductive portions electrically connected together and adapted to contact said electrical contacts to connect the same electrically in certain positions of said pendulum throughout a relatively wide arc of said pendulum, and means for moving said shaft vertically so as to connect said contact members only throughout a relatively narrow arc of said pendulum, said shaft moving means comprising a cylinder lock, said lock comprising a bevel gear connected to the cylinder of said lock and a second bevel gear meshing with said first gear and disposed concentrically about said shaft, said second gear being internally threaded and engaging threads carried by said shaft for moving the latter vertically upon rotation of the cylinder of said lock.

3. In an automatic ignition shut-off device for automobiles, in combination, upper and lower substantially horizontal plates, means for supporting said plates in substantially parallel relation, two shafts slidably supported in said plates for vertical motion and fixed against rotation, two pairs of electrical contacts located in the ignition circuit of the automobile, the contacts of each pair being disposed on opposite sides of one of said shafts, and on a line substantially perpendicular to the line through the contacts of the other pair, a pendulum connected to each shaft and having electrically conductive portions electrically connected together and adapted to contact said electrical contacts to connect the same electrically in certain positions of said pendulum throughout a relatively wide arc of said pendulum, means for moving said shaft vertically so as to connect said contact members only throughout a relatively narrow arc of said pendulum, said shaft moving means comprising a cylinder lock, said lock comprising a bevel gear connected to the cylinder of said lock, a second bevel gear meshing with said first gear and disposed concentrically about one of said shafts, a third gear concentric with said second bevel gear, a fourth gear meshing with said third gear and concentrically disposed about said other shaft, said shafts bearing oppositely threaded portions and at least one gear concentric with each shaft being threaded to engage said threaded portions.

4. In combination with an automobile ignition system, a bottom plate, a top plate disposed above said bottom plate, a gear rotatively mounted on the top face of the bottom plate and formed with a concentric threaded opening, a shaft having a square top portion and a threaded lower portion threadedly engaging the threaded opening of said gear, said shaft having its square top portion slidably extended through a complementary opening formed in said top plate to retain said shaft against rotation to cause the shaft to move up or down when said gear is turned in one direction or the other, an insulation block mounted on the bottom face of said bottom plate and formed with a hole through which the bottom end of said shaft freely extends, spaced contacts mounted on said insulation block on opposite sides of said shaft and connected in series in the ignition system, a pendulum of conductive material pivotally mounted on the bottom end of said shaft, ears extending laterally from the sides of said pendulum and engaging said contacts to be effective through a relatively wide arc of pivotal movement of said pendulum, and key operated means for turning said gear in a direction to move said shaft downward to similarly move said ears downward with relation to said contacts to reduce the effective contact of said ears with said contacts to a relatively small arc of pivotal movement of said pendulum.

ANTHONY F. PANTUOSCO.

REFERENCES CITED

The following references are of record in the file of this patent:

UNITED STATES PATENTS

| Number | Name | Date |
|---|---|---|
| Re. 21,194 | Blanchett | Sept. 5, 1939 |
| 1,175,062 | Johnson | Mar. 14, 1916 |
| 1,331,650 | Kruse | Feb. 24, 1920 |
| 1,568,509 | Kolling et al. | Jan. 5, 1926 |
| 1,625,017 | Birkholz | Apr. 19, 1927 |
| 1,857,637 | Hickok | May 10, 1932 |
| 1,902,578 | Parsons | Mar. 21, 1933 |
| 2,158,181 | Goddard | May 16, 1939 |
| 2,402,111 | Engler | June 11, 1946 |